Patented Mar. 27, 1945

2,372,524

UNITED STATES PATENT OFFICE 2,372,524

PROCESS FOR REMOVING METHYL PHENYL-ACETYLENE FROM RING SUBSTITUTED METHYL STYRENE

Frank J. Soday, Swarthmore, Pa., assignor to The United Gas Improvement Company, a corporation of Pennsylvania No Drawing. Application September 5, 1941, Serial No. 409,680

8 Claims. (Cl. 260—669)

This invention pertains generally to the depolymerization of ring substituted methyl styrene polymers.

More specifically, this invention pertains to the isolation of one or more ring substituted methyl styrenes in relatively pure form from dilute fractions containing the same by polymerization of the said fraction or fractions, followed by the isolation of the polymer obtained and its depolymerization by certain thermal methods to be more fully described hereinafter. Another object of the invention is the recovery of one or more ring substituted methyl styrenes from the still residues commonly obtained as a by-product of the fractionation of fractions containing one or more ring substituted methyl styrenes. A further object of the invention is the depolymerization of the polymer or polymers obtained from one or more ring substituted methyl styrenes by the application of heat to said polymer or polymers when in the form of a thin layer or film. Another object of the invention is the depolymerization of such polymer or polymers by the application of heat thereto when in finely divided form. Still another object of the invention is the conversion of scrap ring substituted methyl styrene polymers, such as, for example, the gates, sprues, and other by-products obtained upon molding ring substituted methyl styrene polymers, by the application of heat to such materials by methods to be more particularly described herein. Other objects and advantages of the invention will be apparent to those skilled in the art upon an inspection of the specification and claims.

In the various processes which have been developed for the manufacture of artificial gas, such as oil gas, carburetted water gas, or coal gas, considerable quantities of tar are produced, and the gas contains substantial quantities of readily condensible materials.

The condensate obtained from the artificial gas, as well as the light oil obtained upon distillation of the tar, constitute sources for many unsaturated and aromatic hydrocarbons. The light oil obtained from the pyrolysis of petroleum or of petroleum hydrocarbons is especially rich in unsaturated hydrocarbons, particularly when temperatures in excess of 1100° F. have been employed in the cracking operations.

Among these unsaturated hydrocarbons are the ring substituted methyl styrenes,

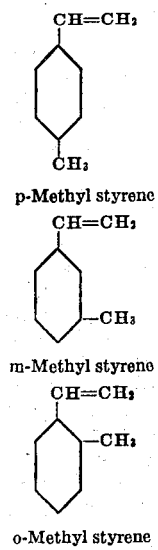

p-Methyl styrene m-Methyl styrene and o-Methyl styrene

Although the light oil from which these ring substituted methyl styrenes may be isolated has been available in commercial quantities for several decades, no satisfactory processes have been developed for the utilization of these materials sufficiently promising to warrant commercial exploitation. Instead, the so-called crude light naphtha in which they occur has been used generally for the production of resins of inferior quality and dark color, as a cut-back for tar or asphalt, or for fuel purposes.

This lack of commercial utilization of these desirable ring substituted methyl styrenes can be directly traced to the lack of a satisfactory method for their isolation in a pure or relatively pure form.

As a result of extensive experimentation, I have discovered that pure or substantially pure ring substituted methyl styrene may be obtained in good yields by the polymerization of fractions or solutions containing one or more ring substituted methyl styrenes, followed by the isolation of the polymer, and its depolymerization in attenuated form by the application of heat.

I have further discovered that upon depolymerization ring substituted styrene polymers tend to rearrange into the meta methyl styrene form in preference to the other two ring substituted forms. In some cases this tendency is very pronounced and is of extreme importance in the production of meta methyl styrene.

While any desired method may be used for the polymerization of the desired fraction or solution, and the isolation of the polymer, the depolymerization of the polymer must be carried out under carefully controlled conditions in order to obtain satisfactory yields of the desired ring substituted methyl styrenes. This is illustrated by the following example, in which a polymer obtained by the polymerization of a light oil methyl styrene fraction was depolymerized by bulk heating methods.

Example

A light oil methyl styrene fraction, obtained by the fractionation of light oil from oil gas, and containing 60% by weight of ring substituted methyle styrenes, was polymerized by heating for a period of 4 days at a temperature of 145° C. The fraction had a boiling range of approximately 167 to 173° C. Upon removing the unpolymerized material present by distillation under reduced pressure, there was obtained a dark colored, brittle polymer in a practically quantitative yield.

A 200 gram portion of this polymer was placed in a small vessel and rapidly heated by means of a suitable burner. The depolymerized material was condensed in a water-cooled condenser and collected in a receiver cooled with solid carbon dioxide. The heating was continued until no further quantities of distillate could be obtained.

Approximately 60% by weight of the polymer was converted to liquid products by this procedure, the remainder being a charred, coke-like mass in the bottom of the reaction vessel.

Upon fractionating the liquid products obtained, a mixture of substantially pure para methyl styrene and meta methyl styrene was obtained. The quantity isolated amounted to approximately 30% by weight of the polymer initially depolymerized. The remainder of the liquid product consisted of oils boiling below and above the methyl styrenes obtained.

It is apparent that this procedure is too imperfect to permit it to be used for the production of ring substituted methyl styrenes upon a commercial scale, as the yield of the desired ring substituted methyl styrenes is far too low. In addition, the charred, coke-like mass not only represents an economic loss of potentially valuable raw material, but it can be removed from the reaction vessel only by the application of considerable force. It is difficult to see how this residual material could be removed from reaction vessels of commercial size in a satisfactory manner without the expenditure of a prohibitive amount of labor.

These unsatisfactory results have been found to be due to the tendency of the polymers obtained from ring substituted methyl styrenes to decompose with the formation of carbonaceous products upon prolonged heating at elevated temperatures, and to the poor heat conductivity of such polymers. Thus, upon the application of heat to a relatively large mass of a ring substituted methyl styrene polymer, the layer of resin adjacent to the source of heat decomposes. In order to decompose the major portion of the remainder of the polymer present, however, the application of very elevated temperatures for prolonged periods of time is required. Consequently, a considerable portion of the polymer is carbonized, while relatively large quantities of undesired oils are obtained, both as a result of the partial depolymerization of the polymer and the recombination of a portion of the ring substituted methyl styrene obtained.

As pointed out previously, I have found that ring substituted methyl styrene may be obtained in excellent yields through the depolymerization of polymers obtained therefrom by the application of heat to such polymers in attenuated form.

An excellent source of dilute ring substituted methyl styrene fractions which may be used as raw materials for the production of pure or substantially pure ring substituted methyl styrene are the light oils obtained from tars of the character previously described.

As a result of extensive experimentation, I have found that light oil fractions derived from oil gas and boiling within the range of approximately 155 to 178° C. contain substantial quantities of nuclear substituted methyl styrenes. Thus, for example, the predominating unsaturated hydrocarbons present in light oil fractions boiling in the range of 165 to 175° C., and more particularly in the range of 167 to 173° C., usually are para methyl styrene and meta methyl styrene.

The concentration and purification of the methyl styrenes contained in such fractions is complicated by the presence therein of various aromatic and naphthenic hydrocarbons having substantially similar boiling points. In addition, a number of other very undesirable impurities also are present in such fractions, such as sulfur, nitrogen, and oxygen containing compounds, and acetylene derivatives, such as the methyl phenyl acetylenes. The latter impurities are particularly undesirable as they inhibit the polymerization of the ring substituted methyl styrene, resulting in the production of resins of very inferior quality.

Due to the presence in such methyl styrene fractions of relatively large quantities of aromatic and naphthenic hydrocarbons having approximately the same boiling range, it has been found to be impossible to isolate relatively pure methyl styrenes from such fractions by fractional distillation methods, even though columns having an efficiency of 100 plates, or more have been utilized for this purpose. In addition, such methods have been attended by the loss of relatively large quantities of the ring substituted methyl styrene in the form of polymers or still residues due to the pronounced tendency of such materials to polymerize under the influence of the elevated temperatures required in such fractional distillation operations. Although the quantity of such polymers obtained can be reduced substantially by the use of certain inhibitors, by the application of reduced pressures say of the order of 8 to 10 millimeters of mercury, absolute, and by the use of fractionating columns designed to give a minimum pressure drop per theoretical plate, the quantity of polymers obtained under the most favorable conditions is still sufficiently large to preclude the possibility of obtaining acceptable yields of methyl styrene fractions containing substantially more than 80% methyl styrenes. This is due to the fact that the rate of polymerization of methyl styrene fractions increases with increasing concentration of such fractions. When a concentration of approximately 80% of methyl styrenes in a given fraction has been achieved by fractional distillation methods, the rate of increase of concentration of the methyl styrenes in such fractions by further fractionation is almost exactly counterbalanced by the increased rate of polymerization of the methyl styrenes present. Consequently, continued fractionation usually leads only to the conversion of larger quantities of the methyl styrenes present to polymers without increasing the concentration of such fractions to any substantial extent.

In addition to the foregoing, the use of fractional distillation methods for the concentration of methyl styrene fractions almost invariably results in the similar concentration of certain of the undesirable impurities present in such fractions. Thus, for example, the fractional distillation of light oil fractions containing methyl styrenes invariably results in the isolation of fractions containing larger proportions of both methyl styrenes and the methyl phenylacetylenes. As the latter compounds are very undesirable ingredients in methyl styrene fractions, particularly when such fractions are to be used for the preparation of resins, in which case the methyl phenylacetylenes act as polymerization inhibitors and deleteriously affect the quality of the resins obtained subsequently, the improvement in the quality of the methyl styrene fractions due to the increase in the concentration of the methyl styrenes contained therein is more than counterbalanced by the corresponding increase in the concentration of the methyl phenylacetylenes.

The isolation of pure or substantially pure ring substituted methyl styrene from fractions or solutions containing the same according to the method disclosed herein is free from the foregoing objections since I have discovered that practically none of the impurities present in such fractions or solutions react in the same manner as the ring substituted methyl styrene in the polymerizing and subsequent depolymerizing steps. Thus, for example, the polymerization of a light oil methyl styrene fraction, the isolation of the polymer obtained, and the depolymerization of the polymer by the methods to be more particularly described herein, results in the isolation of pure or substantially pure methyl styrene containing very little, if any, of the methyl phenylacetylenes.

What has been said with respect to the elimination of the methyl phenylacetylenes by the application of the concentrating method described herein applies equally well to practically all of the other undesirable impurities present in fractions or solutions of ring substituted methyl styrene in general, such as other substituted acetylenes or phenylacetylenes, as well as oxygen, nitrogen, and sulfur containing impurities.

It is apparent, therefore, that the application of the method described herein to ring substituted methyl styrene fractions or solutions results in (a) the concentration of the ring substituted methyl styrene present and (b) the elimination of a very considerable portion, if not all, of the undesirable impurities present.

In addition to light oil fractions, other dilute ring substituted methyl styrene fractions or solutions may be concentrated and refined by the methods disclosed herein. Thus, for example, ring substituted methyl styrene fractions or solutions obtained from the dehydration of certain alcohols or mixtures of alcohols, such as p-tolyl ethyl alcohol, or from the dehydrogenation of certain substituted ethyl benzenes, such as p-methyl ethyl benzene, may be concentrated and refined by the processes described herein with excellent results. However, the problem of purification is almost infinitely greater with light oil fractions among other things because of the presence of a wide variety of impurities.

Fractions or solutions containing almost any given quantity of one or more ring substituted methyl styrene may be used in the processes described herein. Thus, fractions containing as little as 1% ring substituted methyl styrene may be polymerized, the unpolymerized material removed, and the polymer subsequently depolymerized to form ring substituted methyl styrene. However, I generally prefer to use fractions containing somewhat larger quantities of ring substituted methyl styrene, say 10% or more, for economic reasons. Fractions or solutions containing 20%, or more, of ring substituted methyl styrene are particularly desirable for this purpose.

The initial step in the isolation of ring substituted methyl styrene from dilute fractions or solutions containing the same, namely, the polymerization of such fractions or solutions, may be carried out in any desired manner.

Thus, for example, such fractions or solutions may be polymerized by the application of heat. In general, an increase in temperature during such polymerizing processes results in a corresponding decrease in the time required to convert the ring substituted methyl styrene present to polymers and a decrease in the molecular weight of such polymers. As the low molecular weight polymers can be handled somewhat more easily in the depolymerizing processes described herein, due to their friable nature and the relative ease with which they may be dissolved in certain solvents, a preferred embodiment of this invention is the use of such low molecular weight polymers in such processes.

Thus, for example, light oil methyl styrene fractions boiling in the range of 155 to 178° C. may be polymerized by the application of temperatures in the range of 150 to 200° C., or higher, for periods ranging from one to four days, for example, to give excellent yields of polymers which have a low molecular weight, are friable, and may be dissolved readily in aromatic solvents.

Generally speaking, however, any desired polymerizing schedule may be employed and the polymerization may be carried out at atmospheric pressures, and in the presence of any desired gaseous substance, such as air, nitrogen, carbon dioxide, and the like.

In addition, catalysts may be used for the polymerization of such fractions or solutions, either alone or in combination with the simultaneous, or otherwise, application of heat. Examples of such catalysts are peroxides, such as hydrogen peroxide, benzoyl peroxide, stearyl peroxide, and the like; contact materials such as clay, activated clay, carbon, activated carbon, silical gel, alumina, and the like; metallic halides and metallic halide-organic solvent complexes such as aluminum chloride, boron trifluoride, aluminum chloride-diethyl ether complex, and the like; ansolvo acids such as borofluoroacetic acid; mineral acids and mineral acid-organic solvent mixtures or reaction products, such as sulfuric acid and sulfuric acid-diethyl ether mixture; reactive metals such as sodium; and other catalysts or mixtures thereof.

After polymerization, such catalysts preferably are removed from the polymers prior to their depolymerization by the methods to be more particularly described herein. In the case of contact materials, such catalysts usually can be readily removed from the polymer solution by filtration or centrifuging. In the case of metallic halides, ansolvo acids, and mineral acids, such catalyts preferably are hydrolyzed or neutralized by the addition of an alkali or an aqueous solution of an alkali, followed by filtration or centrifuging to remove the hydrolysis products. Reactive metals may be removed by the addition of alcohol, followed by filtration.

Other methods of removing the catalysts employed in such processes may be used, if desired.

By the use of catalysts in conjunction with the use of elevated temperatures, polymers possessing almost any desired physical properties may be obtained. In addition, the complete conversion of the ring substituted methyl styrene present in a given fraction or solution may be accomplished in a minimum of time by the use of certain of the catalysts described in combination with the use of elevated temperatures.

The ring substituted methyl styrene present in a given fraction or solution may be converted to polymers possessing very low melting points by the use of certain catalysts in conjunction with the application of elevated temperatures. Thus, the polymerization of a light oil methyl styrene fraction with activated clay at elevated temperatures resulted in the production of a polymer which was liquid at room temperatures. The use of such low melting or liquid polymers is highly desirable in certain of the depolymerizing processes described herein, as will be more fully explained hereinafter.

By the use of rigorous polymerizing methods, dimers, trimers, and other very low molecular weight products may be obtained from dilute ring substituted methyl styrene fractions or solutions. In general, it may be said that low molecular weight polymers of this type are well adapted for use in the depolymerizing processes of the type described herein.

Irrespective of the method employed in polymerizing the ring substituted methyl styrene fraction or solution, the next step in the process involves the removal of the unpolymerized material present. This can be carried out in any desired manner. Thus, for example, the polymer solution may be distilled, preferably under reduced pressure and/or the application of superheated steam, until all of the unpolymerized material has been removed. The polymer then may be used as such in the subsequent depolymerizing process, or it may be dissolved in a solvent preferably having a boiling point sufficiently different from that of the ring substituted methyl styrene or styrenes to be obtained from the depolymerizing process to be readily separable therefrom. Suitable solvents for this purpose include benzene, toluene, and xylene.

Other methods of isolating the polymer may be used, if desired. Thus, for example, the polymer may be precipitated from its solution in the unpolymerized materials present by the addition of a non-solvent for the polymer therein, such as alcohol. The precipitated polymer then may be further processed to remove unpolymerized material, if desired, such as by working it on heated rolls, or otherwise.

The polymer solution also may be processed to remove unpolymerized material, among other ways, by spray drying methods such as by spraying the polymer solution into a heated tower, either alone or in conjunction with the use of steam or an inert gas to assist in removing the unpolymerized material, by working the material on hot rolls to remove unpolymerized material, or by other methods.

It is preferred that all, or the substantial part, of the unpolymerized material present in such polymer solutions be removed prior to the depolymerization of the polymer contained therein. Otherwise, such unpolymerized materials will contaminate the ring substituted methyl styrenes obtained from the depolymerizing process.

In addition to the use of polymers prepared directly by the polymerization of fractions or solutions containing ring substituted methyl styrene, ring substituted methyl styrene polymers obtained from other sources also may be depolymerized by the processes to be described herein to form ring substituted methyl styrene with excellent results.

A very satisfactory source of such polymers is the still bottoms or residues obtained as a byproduct of the fractionation of solutions or fractions containing ring substitued methyl styrene. Thus, for example, light oil obtained from oil gas, or from other sources, commonly is fractionated to obtain fractions containing substantial proportions of methyl styrenes, among other unsaturated hydrocarbons. As pointed out previously, such fractionating steps result in the production of considerable quantities of polymers from the methyl styrenes present in such fractions, particularly when drastic fractionating methods are employed for the production of fractions containing substantial quantities of methyl styrenes. The still residues obtained from such processes are particularly well adapted to the production of ring substituted methyl styrene by the depolymerizing methods to be described herein.

As such still residues are commonly drained from the still pot or reboiler, either continuously or discontinuously, before all of the unpolymerized material has been distilled therefrom in order to assist in the removal of the still residues from the unit, such materials preferably are treated to remove all unpolymerized material present prior to the depolymerization thereof. The methods discussed previously for the removal of unpolymerized material from polymerized ring substituted methyl styrene fractions or solutions may be used for this purpose with excellent results.

In addition to still residues, ring substituted methyl styrene polymers derived from the polymerization of ring substituted methyl styrene fractions or solutions under other conditions, such as the polymers obtained when such fractions or solutions are stored, shipped, or otherwise handled or treated, also may be used for the production of ring substituted methyl styrene.

In general, ring substituted methyl styrene polymers derived from ring substituted methyl styrene fractions contaminated with methyl phenyl acetylene may be used for the production of pure or relatively pure ring substituted methyl styrene by the depolymerization methods disclosed herein. Thus, for example, scrap ring substituted methyl styrene polymer, such as the sprues, tees, and other waste products obtained from molding, casting, or machining operations, off-colored ring substituted methyl styrene polymer, low grade ring substituted methyl styrene polymer, and the like, of the character described, may be used as raw materials for the depolymerizing processes described herein with excellent results.

As such polymers commonly contain one or more additives, such as plasticizers, dyes, pigments, coloring agents, and the like, certain precautions are preferably observed in order to insure smooth operation of the depolymerizing unit employed. In general, this comprises the removal of all insoluble material present, such as pigments, fillers, and the like, prior to the depolymerization of such polymers or resins in order to prevent undue contamination of the depolymerizing unit, although this is not absolutely necessary, particularly when the depolymerizing unit is provided with a satisfactory method or device for removing such materials from the system as required.

As a general rule, volatile materials, such as solvent and plasticizing agents, present in such polymers or resins do not interfere unduly with the operation of any of the depolymerizing units or processes described herein. Such volatile materials usually are collected with the ring substituted methyl styrene obtained, from which they may be separated by any desired method, if desired, such as by distillation.

Other methods of removing undesirable materials from such scrap or by-product ring substituted methyl styrene polymers prior to the depolymerization thereof may be used, if desired.

The recovery of both purified monomeric styrene and purified monomeric ring substituted methyl styrene from light oil fractions containing both styrene and ring substituted methyl styrene by methods involving polymerization and subsequent depolymerization is described and claimed in my copending applications, Serial No. 427,418, filed January 20, 1942, and Serial No. 430,717, filed February 13, 1942.

The ring substituted methyl styrene polymers, resins, or copolymers may be introduced into the depolymerizing units to be described presently in any desired form. As pointed out previously in discussing the polymerization of ring substituted methyl styrene fractions or solutions, the polymers obtained may be in the form of high, medium or low-melting polymers or even liquid polymers. Low melting and liquid polymers are well adapted for use in the depolymerizing processes disclosed herein.

In general, it may be said that one method of introducing the polymer into the depolymerizing zone comprises its introduction in liquid form. This implies the use of a liquid polymer, or of a molten polymer in which the polymer has been converted to the liquid form by the application of heat prior to its introduction into the depolymerizing zone.

Another method of introducing the polymer into the depolymerizing zone comprises dissolving it in some solvent or mixture of solvents. Care should be exercised in choosing the solvent as in most cases it will be found desirable to separate the solvent from the depolymerized ring substituted methyl styrene after the depolymerizing process has been completed. Consequently, a solvent or mixture of solvents having a boiling point sufficiently far removed from the ring substituted methyl styrene or styrenes to be obtained from the process to enable the respective components to be separated by fractionation, or by other methods, preferably is used to dissolve the polymer. Benzene and toluene are suitable solvents for this purpose. Reference is made to my copending applications Serial Nos. 427,417 and 428,832, both filed January 20, 1942.

A combination of the foregoing methods comprises melting a mixture of solvent and polymer by the application of heat. By the use of this method, relatively small quantities of solvent and moderate temperatures may be employed in the production of a liquid mixture to be introduced into the depolymerizing unit. This may be advantageous in certain cases, particularly from the standpoint of solvent economy.

Another method of introducing the polymer into the depolymerizing zone comprises its reduction to a fairly finely divided form. This may be accomplished, among other ways, by mechanical grinding, machining, or other dispersion methods, or by spray drying or dispersion methods, or otherwise. These methods also may be carried out in such a way that the final product contains appreciable quantities of solvent, if desired.

The depolymerization of the foregoing polymers may be carried out in the presence or absence of certain diluents in the reaction zone, such as steam, solvents, particularly relatively low boiling solvents such as petroleum ether, benzene, and toluene, and inert gases, such as nitrogen, carbon dioxide, stack gases, and the like. These diluents may be heated or superheated prior to their introduction into the reaction zone, in which case they may be used as the sole source of heat in the reaction zone, or they may be used in conjunction with the external application of heat thereto.

The depolymerizing operations may be carried out at atmospheric, sub-atmospheric, or super-atmospheric pressures. In general, atmospheric or sub-atmospheric pressures are preferred.

As the majority of the ring substituted methyl styrene polymers are stable at temperatures below 300–350° C., temperatures above this range normally must be employed in order to obtain satisfactory yields of ring substituted methyl styrene within a reasonable period of time. I have found that the use of temperatures above 400° C. and, particularly, above 500° C. are very satisfactory for the production of ring substituted methyl styrene according to the methods described herein. Temperatures above 600° C. give excellent yields.

The desired polymer may be charged to the reaction zone by any desired method. Thus, for example, if the polymer is in liquid form or in the form of a solution in certain solvents, it may be pumped into the reaction zone, or it may be forced into the reaction zone by the application of pressure, or it may be drawn into the reaction zone by reducing the pressure therein, or otherwise. The container, pipe, tubes, valves, pumps, and other devices and equipment used to store the polymer or polymer solution prior to its delivery to the reaction zone and to deliver it to the reaction zone at the desired rate, may be heated by any desired method to insure that the polymer is maintained at the required temperature, if desired. This may be accomplished, among other ways, by providing such items of equipment with suitable jackets or coils through which steam or any other desired heating medium may be passed, or by the use of electrical resistance heaters for this purpose, or otherwise.

The polymer or polymer solution may be heated to any desired temperature prior to its introduction into the reaction zone, if desired. Thus, for example, it may be heated to a temperature just under the initial decomposition temperature before being introduced into the reaction zone. In case a relatively low boiling solvent is present, the polymer-solvent mixture may be heated under a pressure sufficient to maintain the solvent in the liquid state at the chosen temperature prior to its addition to the reaction zone.

An alternative method of introducing the polymer to the reaction zone comprises carbureting it with steam, a solvent or other liquid in the vapor state, an inert gas, or other suitable agent. This method is especially applicable to liquid polymers or to relatively low-melting polymers possessing an appreciable vapor pressure at temperatures below their initial depolymerizing temperature. Thus, for example, a liquid ring substituted methyl styrene polymer may be heated to a temperature of, say, 200° C. in a suitable vessel. A suitable carbureting medium such as, for example, super-heated steam is passed through the heated liquid polymer, the mixture of steam and polymer then being delivered to the reaction zone. By a suitable control of the type of polymer employed, the temperature to which it has been heated, and the temperature of the steam employed for carbureting purposes, almost any desired ratio of steam and polymer may be delivered to the reaction zone.

In the foregoing methods, the polymer may be delivered to the reaction zone in the form of a thin layer or stream, or in the form of a spray or mist of finely divided particles, depending, among other things, upon the type of fitting employed at the termination of the delivery pipe or other device in the reaction zone.

Another method of introducing the polymer to the reaction zone comprises its addition in a finely divided form in the solid state. This may be accomplished, among other ways, by blowing a stream of the finely divided solid polymer into the reaction zone by means of a continuous blast or stream of an inert gas, the finely powdered polymer being mechanically introduced into such a stream prior to its introduction into the reaction zone.

As pointed out previously, I have found that ring substituted methyl styrene polymers may be readily depolymerized to give good yields by the application of heat to only a limited quantity of such polymers in a given period of time. Any suitable procedure capable of meeting these conditions may be used for the depolymerization of ring substituted methyl styrene polymers.

Thus, for example, the polymer, or polymer solution, may be introduced into a heated vessel provided with a stirring device conforming to the interior thereof and sufficiently close to the sides of the vessel to prevent any undue accumulation of material thereon. In general, vessels of this type provided with a stirrer or scraping device extending over the major portion of the interior surface of such vessels, particularly the lower portion thereof in the case of vertical vessels, are well adapted to the production of ring substituted methyl styrene in good yields from its polymers by thermal depolymerization. In general, the clearance between the heated walls of such vessels and the agitator or scraper should preferably be less than ¼" and, more preferably, less than ⅛". Excellent results are obtained when the clearance between the two surfaces is 1/16" or less, and the optimum results are obtained when the agitator or scraper actually scrapes the interior surface of the reaction vessel. Thus, for example, vessels of the type commonly employed in the petroleum industry for blending or compounding greases, and in which the agitator scrapes the rounded bottom and the lower portions of the sides of the reaction vessel, are well adapted to the preparation of ring substituted methyl styrene by thermal depolymerization. The resin is distributed on the bottom and sides of the reactor by means of the agitator blade, the rate of flow of the resin and the depolymerizing temperature usually being so regulated that only a thin film of resin is present on the bottom and sides of the reaction vessel at any given period of time.

The foregoing represents one method of depolymerizing ring substituted methyl styrene polymers by depositing them in the form of a thin film, or otherwise, upon the interior of a reaction vessel, an agitator being employed to prevent or retard any undesirable accumulation of polymer upon the interior surface thereof. A large number of similar devices or units embodying the same principles may be employed for the depolymerization of ring substituted methyl styrene polymers if desired.

It will be understood of course that the foregoing units only serve to illustrate one method of realizing the advantages of the invention and are not to be construed as limiting it in any way. In general, any method of depositing a relatively thin layer of the desired polymer upon a heated surface will serve to depolymerize the polymer in a satisfactory manner.

Another suitable method for the depolymerization of ring substituted methyl styrene polymers comprises contacting such polymers with a molten metal, alloy, salt, mixture of salts, or other liquids capable of withstanding relatively high temperatures without appreciable decomposition. During the operation, the molten metal or other material may be agitated if desired.

An excellent method for the depolymerization of ring substituted methyl styrene polymers comprises the application of heat thereto while in a very finely divided form. Any desired method of subdividing the polymers may be employed, such as pumping or forcing the polymers in liquid or molten condition, or in the form of a solution in certain solvents, through a suitable nozzle, orifice, constriction, or fitting designed to subdivide the stream into a relatively large number of small, discrete particles. Other methods of accomplishing this purpose may, of course, be used if desired. Thus, for example, the polymer or polymer solution may be pumped, flowed, or otherwise delivered to the top of a suitable tower or vessel and permitted to flow over a perforated plate or screen, or both, or otherwise, in such manner as to disperse the material in the form of very thin streams, or drops, or otherwise.

Other methods and devices suitable for contacting the finely divided polymer or polymer solution may, of course, be employed. Thus, for example, the reaction vessel or tower may be conical in shape in order to prevent or retard any undue accumulation of polymer on the sides of the vessel. Other refinements will, of course, be apparent to those skilled in the art.

Another suitable method of depolymerizing ring substituted methyl styrene polymers is to pump, blow or otherwise force them through a tubular unit possessing a fairly narrow cross-sectional area, preferably while the polymer or polymer solution is in a finely divided or vaporized form, or otherwise. A pipe coil, tube bundle, or conventional cracking furnace may be used for this purpose with excellent results.

The polymers may be charged to a single coil furnace, either alone or in admixture or in combination with steam, a solvent, a gas, or a mixture thereof, the preheating and depolymerizing processes being carried out in the same coil. An alternative method comprises preheating the polymer, or the polymer solution or admixture, in one coil, then delivering such preheated material to a second coil in which the depolymerization is effected, either alone or in the presence of steam, a solvent, or a gas, or a mixture thereof, which mixture may be added to the polymer at the inlet, or within, the second coil.

Another method comprises heating the assisting agent, such as steam, a solvent, a gas, or a mixture thereof in one coil, then delivering such heated assisting agent or agents to the second coil in conjunction with a stream of polymer or polymer solution, or a mixture of the polymer and steam, a solvent, and/or a gas.

Other methods familiar to those engaged in the pyrolysis of petroleum may be used if desired. Other types of furnaces also may be employed, such as the de Florez furnace, a tube coil immersed in a molten metal bath, and the like.

In addition, the polymer or polymer solution or admixture may be charged to a conventional gas set, or a modification thereof, such as those employed for the production of blue gas, oil gas, carburetted water gas, and the like.

Other methods based upon heating a stream of finely divided ring substituted methyl styrene polymers, either alone or in conjunction with one or more assisting agents such as steam, a solvent, a gas, or a mixture thereof may be used, if desired.

It is to be understood, also, that any combination of the foregoing depolymerizing methods may be used for the production of ring substituted methyl styrene.

The method of condensing and cooling the depolymerized materials obtained also is important from the standpoint of obtaining good yields. The vapors should be condensed and cooled as rapidly as possible in order to prevent any recombination and to prevent side reactions from occurring to any substantial degree. This may be accomplished by conducting the vapors into an efficient condenser and cooler as quickly as possible, a satisfactory condenser for this purpose being a water cooled sheet and tube condenser. The depolymerized materials also may be shock-cooled if desired, such as by injecting a spray or stream of water or other cooling medium directly into the depolymerized products obtained from the reaction zone, or by passing the depolymerized vapors through a wash box filled with water, or otherwise.

In general, it may be said that the best results are obtained when the polymer is depolymerized in the form of thin films or small discrete particles or streams in the shortest possible period of time, then condensing and cooling the depolymerized products in the shortest possible period of time. Any undue increase in the depolymerizing time, or the time required to condense and cool the depolymerized materials, usually is reflected in decreased yields and in the presence of higher boiling oils and other undesirable by-products in the ring substituted methyl styrene product.

The steam, solvents, gases, or mixtures thereof, which may be charged to the depolymerizing unit with the polymer assist in the reaction in many ways. They may serve to transmit heat directly to the polymer, to assist in sweeping out the products of the depolymerization from the reaction zone in the shortest possible period of time, and to serve as diluting agents, thus preventing, or reducing the rate of, the recombination of the depolymerized materials.

As pointed out previously, also, the steam, solvent vapors, gases, or mixtures thereof used as assisting agents in the depolymerization of ring substituted methyl styrene polymers may be preheated to any desired extent before being added to the polymer or introduced into the reaction zone, or otherwise, and such agent or agents may be used as the sole source of heat, if desired.

By the use of the foregoing methods for the depolymerization of ring substituted methyl styrene polymers, all of which are based upon the principle of exposing a limited quantity of the said polymers to elevated temperatures for a limited period of time under conditions designed to effect a rapid transfer of heat from the heating surface or medium to the polymer and removing the depolymerized materials from the heating zone and condensing and cooling them as rapidly as possible, excellent yields may be obtained.

It should be emphasized that the depolymerization should be carried out in a relatively short period of time. The application of elevated temperatures to ring substituted methyl styrene polymers for prolonged periods of time, such as are encountered for example in batch depolymerizing methods, results in the conversion of a relatively large proportion of such polymers into high boiling oils and similar undesirable impurities. In general, it may be said that the time of depolymerization is a function of the depolymerizing temperature employed. By the use of the proper type and size of unit, the contact time in the depolymerizing zone should rarely exceed 10 minutes and, in most cases will not exceed 5 minutes. Contact times substantially under 5 minutes and, more particularly, under 1 minute, will be found to give excellent results.

The use of an assisting agent, such as steam, a solvent, a gas, or a mixture thereof during the depolymerizing process will materially reduce the contact time in the depolymerizing unit.

By depolymerizing ring substituted methyl styrene polymers, or mixtures of ring substituted methyl styrene polymers with other materials according to the method described, particularly when units of the type mentioned are used for this purpose, excellent yields of ring substituted methyl styrene containing very little, if any, higher boiling oils and/or other undesirable by-products are obtained. Thus, for example, the depolymerization of methyl styrene polymers obtained from a light oil fraction boiling in the range of 165 to 175° C. will give yields up to 80% by weight of the original polymer, or even higher, when such polymers are depolymerized according to my invention.

By the practice of my process, methyl styrene of 98% purity and higher, whether in solution in a considerable quantity of solvent or not, is readily obtainable.

For the purposes of the specification and the claims the term "attenuated form" or its equivalent, unless otherwise modified is intended to embrace sheet form, spray form, discrete particle form, small stream form, filament form, vapor form and similarly subdivided forms adapted for rapid heat transfer throughout the body of the material in process.

While specific procedures for the depolymerization of ring substituted methyl styrene polymers have been particularly described, as well as the units in which such depolymerization may be conducted, it is to be understood that these are by way of illustration. Therefore, changes, omissions, additions, substitutions, and/or modifications may be made within the scope of the claims without departing from the spirit of the invention.

I claim:

1. A process for purifying ring-substituted methyl styrene contained in a light oil ring-substitued methyl styrene fraction contaminated with methyl phenly acetylene which comprises polymerizing said fraction, separating the resulting polymer from unpolymerized material, heating the separated polymer in attenuated form under temperature conditions at least as high as 350° C. for a period of time sufficient to effect depolymerization but insufficient to cause the formation of a substantial quantity of high boiling oil, and recovering monomeric ring-substituted methyl styrene in purified form and substantially less contaminated with methyl phenyl acetylene.

2. A method for purifying ring-substituted methyl styrene contained in a light oil ring-substituted methyl styrene fraction contaminated with methyl phenyl acetylene which comprises polymerizing said fraction by the application of heat, separating the resulting polymer from unpolymerized material, heating the separated polymer in attenuated form under temperature conditions at least as high as 400° C. for a period of time sufficient to effect depolymerization but not exceeding five minutes, and recovering monomeric ring-substituted methyl styrene in purified form and substantially less contaminated with methyl phenyl acetylene.

3. A method for purifying ring-substituted methyl styrene contained in a light oil ring-substituted methyl styrene fraction boiling between 155° C. and 178° C. and contaminated with methyl phenyl acetylene comprising polymerizing said fraction, separating the resulting polymer from unpolymerized material, heating the separated polymer in attenuated form in the presence of a diluent in vapor phase and under temperature conditions between 350° C. and 600° C. for a period of time sufficient to effect depolymerization while removing and condensing resulting vapor phase material substantially as rapidly as formed to recover monomeric ring-substituted methyl styrene in purified form and substantially less contaminated with methyl phenyl acetylene.

4. A process for the purification of ring-substituted methyl styrene contained in a light oil ring-substituted methyl styrene fraction boiling between 155° C. and 178° C. and contaminated with methyl phenyl acetylene which comprises heating said fraction to obtain heat polymer, separating said polymer from unpolymerized material, subjecting said separated polymer in attenuated form to temperature conditions between 350° C. and 600° C. for a period sufficient to cause depolymerization while removing and condensing resulting vapor phase material substantially as rapidly as formed to recover monomeric ring-substituted methyl styrene substantially less contaminated with methyl phenyl acetylene.

5. A method for purifying ring-substituted methyl styrene contained in a light oil fraction boiling between 155° C. and 178° C. and contaminated with methyl phenyl acetylene which comprises fractionally distilling said light oil fraction thereby obtaining a still residue containing polymer including polymerized ring-substituted methyl styrene, separating said polymer from unpolymerized material, subjecting said separated polymer in attenuated form to heating under temperature conditions between 350° C. and 600° C. for a time sufficient to effect depolymerization while removing and condensing resulting vapor phase material substantially as rapidly as formed to recover monomeric ring-substituted methyl styrene in a form containing substantially less methyl phenyl acetylene contamination.

6. A method of recovering purified ring-substituted methyl styrene from a light oil fraction containing the same and containing contamination in the form of methyl phenyl acetylene which comprises concentrating ring-substituted methyl styrene in said fraction by the fractional distillation thereof, thereby obtaining a still residue containing polymerized material including polymerized ring substituted methyl styrene, separating said polymer contained in said still residue from unpolymerized material therein, subjecting said separated polymer in attenuated form to temperature conditions at least as high as 400° C. for a period of time sufficiently long to effect depolymerization but not exceeding five minutes, and recovering monomeric ring-substituted methyl styrene in purified form and less contaminated with methyl phenyl acetylene.

7. A method for the purification of methyl styrene contained in a ring-substituted methyl styrene light oil fraction boiling between 155° C. and 178° C. and contaminated with methyl phenyl acetylene which comprises polymerizing said fraction to obtain a polymer containing polymerized ring-substituted methyl styrene, separating said polymer from unpolymerized material, subjecting said separated polymer in attenuated form to temperature conditions between 400° C. and 600° C. for a period of time sufficiently long to cause depolymerization but not exceeding one minute, and recovering monomeric ring-substituted methyl styrene substantially free from methyl phenyl acetylene.

8. A method for producing purified monomeric ring-substituted methyl styrene from a light oil fraction boiling between 155° C. and 178° C. and containing ring-substituted methyl styrene and containing contamination in the form of methyl phenyl acetylene which comprises fractionally distilling said light oil fraction to obtain a still residue containing polymer including polymerized ring-substituted methyl styrene, separating said polymer from unpolymerized material contained in said still residue, subjecting said separated polymer in attenuated form to temperature conditions between 400° C. and 600° C. for a period of time at least sufficiently long to effect depolymerization but less than one minute, and recovering monomeric ring-substituted methyl styrene substantially free from methyl phenyl acetylene.

FRANK J. SODAY.